United States Patent
Umnov et al.

(10) Patent No.: US 8,553,326 B2
(45) Date of Patent: Oct. 8, 2013

(54) ADD AND DROP CIRCULATOR

(75) Inventors: Alexander Umnov, Sachse, TX (US); Takao Naito, Tokyo (JP)

(73) Assignee: Fujitsu Limited, Kawasaki-shi (JP)

( * ) Notice: Subject to any disclaimer, the term of this patent is extended or adjusted under 35 U.S.C. 154(b) by 337 days.

(21) Appl. No.: 12/956,246

(22) Filed: Nov. 30, 2010

(65) Prior Publication Data
US 2012/0134022 A1     May 31, 2012

(51) Int. Cl.
*G02B 5/30* (2006.01)
*G02B 6/27* (2006.01)

(52) U.S. Cl.
CPC .................................. *G02B 6/2746* (2013.01)
USPC ..................................................... 359/484.05

(58) Field of Classification Search
None
See application file for complete search history.

(56) References Cited

U.S. PATENT DOCUMENTS

| | | | | |
|---|---|---|---|---|
| 7,039,278 B1 * | 5/2006 | Huang et al. | ..................... | 385/47 |
| 7,362,504 B2 * | 4/2008 | Pan et al. | ................. | 359/484.05 |
| 2002/0172454 A1 | 11/2002 | Chang | .............................. | 385/24 |
| 2003/0035172 A1 | 2/2003 | Chen et al. | .................... | 359/127 |

OTHER PUBLICATIONS

"Generic Requirements for Passive Optical Components", General Information, GR-1209-CORE, Issue 3, Section 2.4.4 Isolator and Circulator Applications, pp. 2-31-2-37, Mar. 2001.
Perrin; "The Need for Next-Generation ROADM Networks"; Heavy Reading; www.heavyreading.com ; pp. 15, Sep. 2010.
"Generic Requirments for Passive Optical Components : General Information"; GR-1209-CORE; Issue 3; pp. 7, Mar. 2001.

* cited by examiner

*Primary Examiner* — Derek S Chapel
(74) *Attorney, Agent, or Firm* — Baker Botts L.L.P.

(57) ABSTRACT

In accordance with one embodiment of the present disclosure, an optical signal bidirectional transmission system comprises a bi-directional port configured to receive and output optical beams, an input port configured to receive beams and an output port configured to output beams, and only one birefringent crystal. A first beam manipulation system configured to adjust polarization of the beams, and direct the beams from the bi-directional port to the birefringent crystal. A second beam manipulation system configured to adjust polarization of the beams, and direct the beams from the input port to the birefringent crystal. The birefringent crystal is configured to direct the beams received from the first beam manipulation system such that the beams may exit the second beam manipulation system through the output port and direct the beams received from the second beam manipulation system such that the beams may exit the first beam manipulation system through the bi-directional port.

15 Claims, 8 Drawing Sheets ns,326 B2

ADD AND DROP CIRCULATOR

TECHNICAL FIELD

The present disclosure relates generally to optical networks and, more particularly, to an add/drop circulator configured to add and drop beams to an optical network.

BACKGROUND

Telecommunications systems, cable television systems and data communication networks use optical networks to rapidly convey large amounts of information between remote points. In an optical network, information is conveyed in the form of optical beams through optical fibers. Optical fibers comprise thin strands of glass capable of communicating the beams over long distances with very low loss of beam strength.

In recent years, the use of telecommunication services has increased dramatically. As the demand for telecommunication services continues to grow, system requirements have also grown. An emerging demand is implementation of colorless/directionless nodes that provide for better system capability and flexibility. However, the complex nature of colorless/directionless nodes also increases the cost of producing these nodes.

SUMMARY

In accordance with the present disclosure disadvantages and problems associated with implementing a reduced cost colorless/directionless node may be reduced.

In accordance with one embodiment of the present disclosure, an optical signal bidirectional transmission system comprises a bi-directional port configured to receive an eastward beam and output a westward beam, an input port configured to receive the westward beam and an output port configured to output the eastward beam. The system further comprises only one birefringent crystal including a first side and a second side opposite of the first side. The system also comprises a first beam manipulation system coupled to the bi-directional port and the first side of the birefringent crystal, and configured to receive the eastward beam from the bi-directional port, adjust a polarization of the eastward beam, and direct the eastward beam from the bi-directional port to the first side of the birefringent crystal. The system additionally comprises a second beam manipulation system coupled to the input port, the output port, and the second side of the birefringent crystal, and configured to receive the westward beam from the input port, adjust a polarization of the westward beam, and direct the westward beam from the input port to the second side of the birefringent crystal. Wherein the birefringent crystal is configured to receive, at the first side, the eastward beam from the first beam manipulation system and direct the eastward beam, according to the polarization of the eastward beam, toward the second beam manipulation system such that the eastward beam may exit the second beam manipulation system through the output port. The birefringent crystal is further configured to receive, at the second side, the westward beam from the second beam manipulation system and direct the westward beam, according the polarization of the westward beam, toward the first beam manipulation system such that the westward beam may exit the first beam manipulation system through the bi-directional port.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
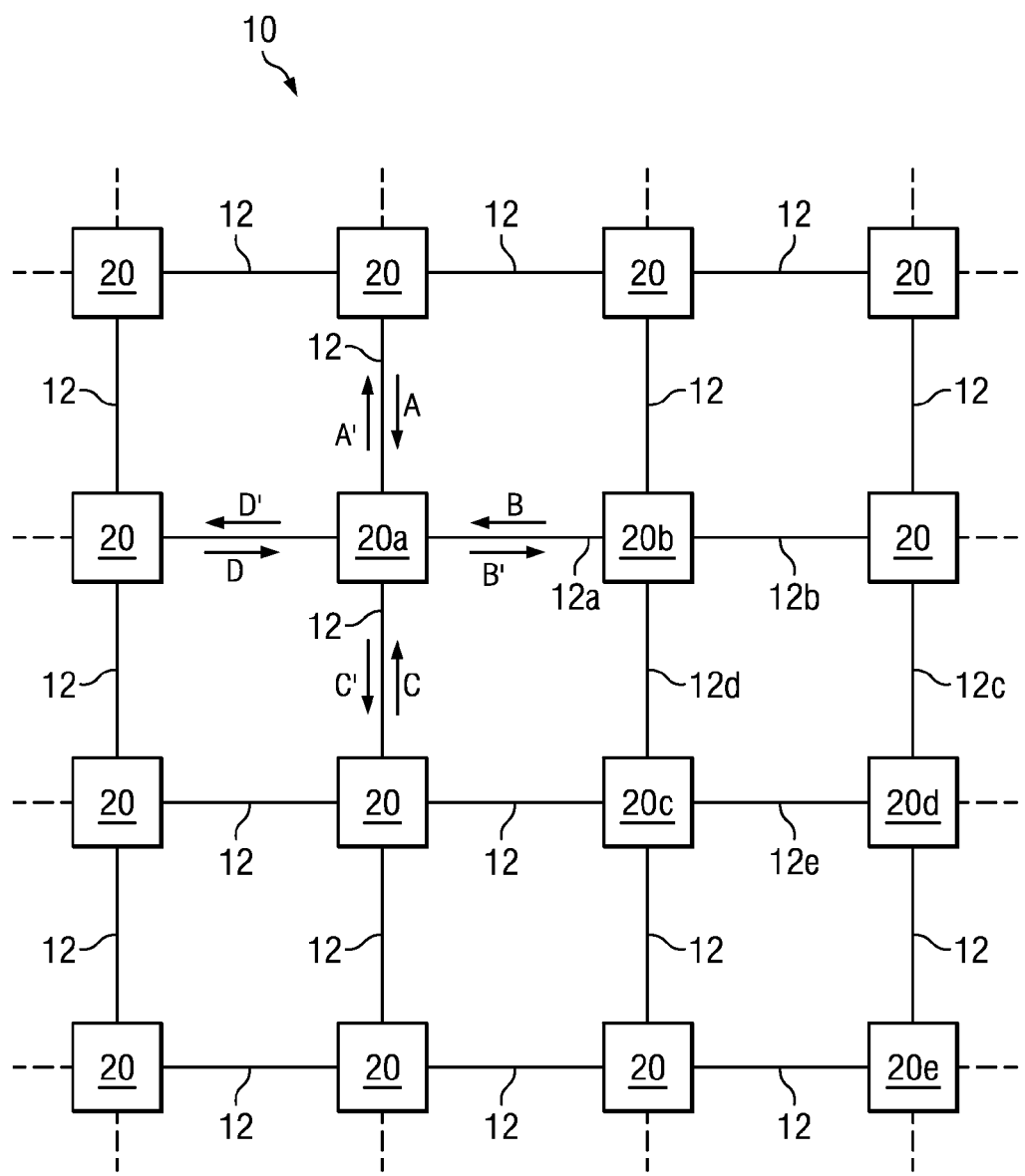
FIG. 1 is a block diagram illustrating a mesh optical network.

FIG. 1 is a block diagram illustrating a mesh optical network 10. Mesh optical network 10 includes one or more optical fibers 12 operable to transport one or more optical beams communicated by components of mesh network 10. The components of mesh network 10, coupled together by optical fibers 12, include a plurality of nodes 20. In the illustrated network 10, each node 20 is coupled to four other nodes to create a mesh. However, any suitable configuration of any suitable number of optical nodes 20 may create mesh network 10. For example, one or more nodes 20 in mesh network 10 may have less or more interconnections with other nodes 20. Mesh network 10 may represent all or a portion of a short-haul metropolitan network, a long-haul inter-city network, and/or any other suitable network or combination of networks. Optical fibers 12 represent any suitable type of fiber. For example, the optical fiber coupling two nodes 20 may comprise, as appropriate, a single uni-directional fiber, a single bi-directional fiber, or a plurality of uni- or bi-directional fibers. More particularly, optical fiber 12 may include a Single-Mode Fiber (SMF), Enhanced Large Effective Area Fiber (E-LEAF), TrueWave® Reduced Slope (TW-RS) fiber, or other suitable fiber.

As mentioned above, mesh network 10 may be operable to communicate optical beams carrying information from one node 20 to one or more other nodes 20. In particular, mesh network 10 may allow transponders (not shown) coupled to a node 20 to communicate with one or more other transponders coupled to one or more of the other nodes 20.

Mesh network 10 communicates information or "traffic" over optical fibers 12. As used herein, "traffic" means information transmitted, stored, or sorted in mesh network 10. Such traffic may comprise optical beams having at least one characteristic modulated to encode audio, video, textual, and/or any other suitable data. The data may also be real-time or non-real-time. Modulation may be based on phase shift keying (PSK), intensity modulation (IM), or other suitable methodologies. Additionally, the traffic communicated in mesh network 10 may be structured in any appropriate manner including, but not limited to, being structured in frames, packets, or an unstructured bit stream.

Traffic may be carried in a single optical beam that comprises a number of optical channels or wavelengths. The process of communicating traffic at multiple channels of a single optical beam is referred to in optics as wavelength division multiplexing (WDM). Dense wavelength division multiplexing (DWDM) refers to multiplexing a larger (denser) number of wavelengths, usually greater than forty, into a fiber. The optical beam includes different channels combined as a single beam on optical fiber 12. WDM, DWDM, or other suitable multi-channel multiplexing techniques are employed in optical network 10 to increase the aggregate bandwidth per optical fiber 12. Without WDM or DWDM, the bandwidth in the network would be limited to the bit rate of only one wavelength. With more bandwidth, optical networks are capable of transmitting greater amounts of information. For example, node 20 in mesh network 10 is operable to transmit and receive disparate channels using WDM, DWDM, or other suitable multi-channel multiplexing technique.

Nodes 20 in mesh network 10 may comprise any suitable nodes operable to transmit and receive traffic in a plurality of channels. For example, nodes 20 may comprise of a reconfigurable optical add/drop multiplexer (ROADM) architecture based on Wavelength Selective Switches (WSS) and optical crossconnects. In the illustrated embodiment, each node 20 may be configured to transmit traffic directly to four other nodes 20 and receive traffic directly from the four other nodes 20. For example, as illustrated in FIG. 1, node 20a may be capable of receiving input beams A-D from four nodes 20 and forwarding output beams A'-D' to the four nodes 20. Each output beam, A'-D', can include traffic in one or more channels from one or more of the input beams and/or traffic added at node 20a.

The number of nodes 20 that a node 20 may transmit traffic to or receive traffic from may be referred to as degrees. For example, in the illustrated embodiment, mesh network 10 may include four degrees because each node 20 includes four ports that may transmit traffic to or receive traffic from four other nodes 20.

Nodes 20 in mesh network 10 may use any suitable route to transmit traffic to a destination node 20. As discussed above, fibers 12 may each be a single uni-directional fiber, a single bi-directional fiber, or a plurality of uni- or bi-directional fibers. For example, node 20a transmitting traffic to node 20d may transmit the traffic over fibers 12a, 12b, and 12c or, alternatively, over fibers 12a, 12d, and 12e. Many other paths are possible. Therefore, if fiber 12b fails, node 20a may continue to transmit traffic to node 20d over an alternate path. Fibers 12 may fail or break for any number of reasons, such as being cut, being tampered with, or other occurrences. Furthermore, one or more nodes or other equipment in a path may fail. Mesh network 10 addresses the possibility of failing fibers and/or equipment by allowing flexibility in transmitting traffic between nodes 20.

Modifications, additions, or omissions may be made to mesh network 10 without departing from the scope of the disclosure. The components and elements of mesh network 10 described may be integrated or separated according to particular needs. Moreover, the operations of mesh network 10 may be performed by more, fewer, or other components. For example, although network 10 is depicted as having four degrees, network 10 may include any number of degrees according to the requirements and limitations of network 10 and the components included in network 10.

Figure 2:
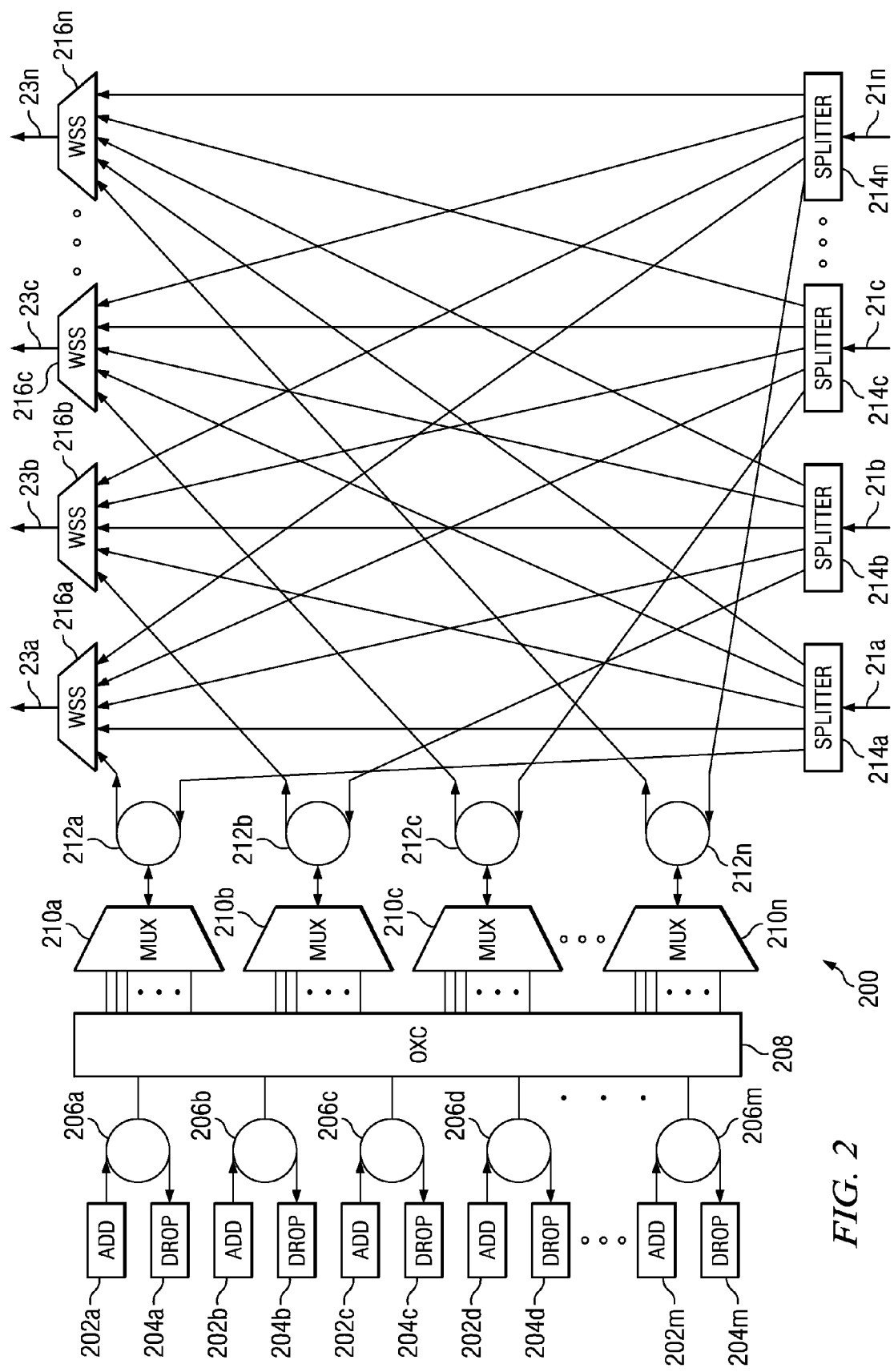
FIG. 2 is a block diagram illustrating a node in the mesh network of FIG. 1.

FIG. 2 is a block diagram illustrating a system 200 similar to node 20 in mesh network 10 of FIG. 1. As will be discussed below, system 200 may comprise a colorless/directionless architecture less expensive than traditional colorless/directionless architectures.

One demand of telecommunication providers is to implement colorless and directionless nodes to improve communication and flexibility within networks. Colorless nodes are nodes capable of transmitting and receiving traffic in any wavelength. Directionless nodes are nodes that are capable of receiving or transmitting traffic at any port. Direction dependent nodes include ports that are either capable of transmitting traffic or receiving traffic, but not both. Implementing colorless, directionless nodes can add complexity and cost to a system.

One challenge faced by those attempting to implement a colorless/directionless node for use in a mesh network topology is reducing the number of expensive components included in the node, and thus reducing the cost of the node itself. For example, to achieve colorless nodes, optical cross-connects (OXCs) may be used. Optical cross-connects may provide for switching of the information carried in one or more channels of one or more input beams to one or more channels of one or more output beams, allowing the node to be colorless. To achieve directionless nodes, some traditional implementations may require a cross-connect for adding traffic to a network and may require another cross-connect for dropping traffic from the network. Due to the high switching capabilities of optical cross-connects, optical cross-connects may be very expensive to produce and manufacture.

FIG. 2 illustrates an example architecture of a system 200 that reduces the number of expensive components needed to implement a colorless/directionless node in a mesh network. In the illustrated embodiment, system 200 includes add ports 202, drop ports 204, add/drop circulators 206 and 212, one or more optical cross-connect 208, multiplexers/demultiplexers 210, splitters 214 and WSSs 216.

Add ports 202 may be included on the add side of system 200. Add ports 202 may be any system, apparatus or device configured to receive and transmit traffic that is to be added to network 10. In some embodiments, add ports 202 may be optical transmitters configured to receive electrical beams from another network, and modulate the information contained in the input beams on the wavelength or channel of light produced by the laser of the optical transmitter to be transmitted through network 10. Although add ports 202 are described as optical transmitters, traffic may be added to network 10 from any suitable source using any appropriate technique.

Drop ports 204 may be included on the drop side of system 200. Drop ports 204 may be any system, apparatus or device configured to receive traffic from network 10 that is to be dropped from network 10 and sent elsewhere. In some embodiments drop ports 204 may comprise optical receivers configured to receive optical beams and convert the information contained in the optical beams onto an electrical stream of data to be transmitted elsewhere. Although drop ports 204 are described as optical receivers, traffic may be dropped from network 10 using any suitable component and sent to any suitable network using any suitable technique.

Add traffic from add ports 202 may be sent to add/drop circulators 206. Additionally, drop traffic may be sent to drop ports 204 through add/drop circulators 206. Each add/drop circulator 206 may receive add traffic from an add port 202 and also send drop traffic to the drop port 204 corresponding with the add port 202, such that system 200 includes the same number of add/drop circulators 206 as add ports 202 and drop ports 204. For example, add/drop circulator 206a may receive add traffic from add port 202a and may send drop traffic to drop port 204a, add/drop circulator 206b may receive add traffic from add port 202b and may send drop traffic to drop port 204b, etc., through add/drop circulator 206m receiving add traffic from add port 202m and sending drop traffic to drop port 204m.

Add/drop circulators 206 may include an input port configured to receive traffic and an output port configured to send traffic. Add/drop circulators 206 may also include a bi-directional port configured to send traffic received at the bi-directional port to the output port. The bi-directional port may also be configured to receive traffic at the input port and direct the traffic out of the add/drop circulator 206 through the bi-directional port. Accordingly, traffic traveling through either the output or input ports of add/drop circulators 206 travels through the bi-directional ports of add/drop circulators 206.

In operation, with respect to system 200, add/drop circulator 206 may receive add traffic from an add port 202 at the input port and transmit the add traffic out the bi-directional port. Additionally, add/drop circulator 206 may receive drop traffic at the bi-directional port and send the drop traffic through the output port to a drop port 204.

Each Add/drop circulator 206 may be optically coupled to optical cross-connect 208 at individual ports included in the cross-connect, such that each add/drop circulator 206 corresponds with a cross-connect port. In the present illustration, system 200 may include m number of add ports 202 and m number of drop ports 204 coupled to m number of add/drop circulators 206. Thus, one side of cross-connect 208 may include m number of ports each coupled to the bi-directional port of one of the add/drop circulators 206.

Add/drop circulators 206 allow for add and drop traffic of corresponding add and drop ports 202 and 204 to be transmitted to the same port of cross-connect 208. Thus, add/drop circulators 206 allow for one cross-connect 208 to be used for routing add/drop traffic, in contrast to traditional architectures that do not include add/drop circulators 206 and need one cross-connect for add traffic and another cross-connect for drop traffic. Accordingly, the implementation of add/drop circulators 206 in system 200 may reduce the number of cross-connects needed.

The other side of cross-connect 208 may also include ports that correspond with each channel of each degree of system 200. For example, in the present illustration, system 200 includes n degrees, and each degree may transmit traffic at p number of channels, such that the other side of the cross-connect may include n*p ports. Accordingly, cross-connect 208 may comprise an m×(n*p) cross-connect representing m ports on one side and n*p ports on the other side. Cross-connect 208 may be any suitable optical device that is configured to forward traffic from any of the m ports on one side of cross-connect 208 to any of the p ports on the other side of cross-connect 208, and vice versa. The term "sides" of a cross-connect 208, is not limited to the physical location of the ports of cross-connect 208 but generally refers to the ports that cross-connect 208 may forward beams to or receive beams from with respect to any other given port, such that cross-connect 208 may forward beams to any port on one "side" of cross-connect 208 to any other port on the other "side" of cross-connect 208.

System 200 may also include multiplexers/demultiplexers (MUX) 210 coupled to the p ports. System 200 may include a different MUX that corresponds with each degree and each of the different transmission channels associated with that degree. For example, MUX 210a may be associated with the first degree of system 200 and MUX 210a may be coupled to the set of p ports associated with channels one through p of the first degree of system 200; MUX 210b may be coupled to the set of p ports associated with channels one through p of the second degree of system 200, etc., through MUX 210n being associated with the nth degree and coupled to the set of p ports associated with channels one through p of the nth degree of system 200.

MUXs 210 represent any suitable optical component configured to receive and combine add traffic, received in disparate optical channels from cross-connect 208, into a WDM or other optical beam to be sent to a bi-directional port of an add/drop circulator 212. MUXs 210 may also act as demultiplexers configured to receive, from the bi-directional port of an add/drop circulator 212, an optical beam carrying a plurality of multiplexed channels, demultiplex the disparate channels in the optical beam, and pass each beam transmitted at the disparate channels to cross-connect 208.

Each add/drop circulator 212 may be associated with each degree of system 200. Additionally, each add/drop circulator 212 may be coupled to a MUX 210 associated with its respective degree via the bi-directional port of the add/drop circulator 212. For example, add/drop circulator 212a may be associated with the first degree of system 200 and the bi-directional port of add/drop circulator 212a may be coupled to MUX 210a, which is also associated with the first degree of system 200. Add/drop circulator 212b may be associated with the second degree of system 200 and the bi-directional port of add/drop circulator 212b may be coupled to MUX 210b, which may also be associated with the second degree of system 200, etc.

Each add/drop circulator 212 may receive drop traffic at the input port of the add/drop circulator 212, and each add/drop circulator 212 may be configured to receive the drop traffic at the input port and direct the drop traffic through the bi-directional port to the MUX 210 associated with the add/drop circulator 212. For example add/drop circulator 212a may receive drop traffic at its input port and direct the drop traffic through its bi-directional port to MUX 210a, where MUX 210a may act as a demultiplexer (DEMUX) with respect to the drop traffic.

Additionally, each add/drop circulator 212 may receive add traffic, at its bi-directional port, from the MUX 210 associated with the add/drop circulator 212. Each add/drop circulator 212 may be configured to receive the add traffic at the bi-directional port and direct the add traffic to the output port of the add/drop circulator 212. For example, add/drop circulator 212a may receive add traffic at its bi-directional port, from MUX 210a, and route the add traffic from the bi-directional port to its output port.

Accordingly, add/drop circulators 212 allow for add/drop traffic for each degree to be transmitted through the same MUX 210. Thus, add/drop circulators 212 eliminate the need for an individual MUX 210 per degree for add traffic and another MUX 210 (acting as a demultiplexer) per degree for drop traffic. Additionally, as noted above with respect to add/drop circulators 206, add/drop circulators 212 help eliminate the need for separate cross-connects 208 for adding and dropping traffic. Add/drop circulators 206 and 212 may be relatively inexpensive compared to MUXs 210 and cross-connects 208. Therefore, reducing the number of relatively expensive MUXs 210 and cross-connects 208 by using relatively inexpensive add/drop circulators 206 and 212 may reduce the overall cost of a node in a mesh network (e.g., node 20 of FIG. 1).

In some implementations, traditional circulators may be utilized instead of special add/drop circulators to achieve the same results. A traditional optical circulator is a device that allows beams of light to travel in only one direction through the circulator (e.g., clockwise but not counter-clockwise). For example, a three port optical circulator may have three conditions to satisfy. The three conditions may be to allow beams to travel from port 1 to port 2, from port 2 to port 3 and from port 3 to port 1 such that beams enter and exit a traditional circulator in a symmetrical manner. However, the added functionality of directing beams from port 3 to port 1 is not necessary for the add/drop application described with respect to FIG. 2. Accordingly, add/drop circulators 212 may be designed without this added functionality, thus requiring satisfaction of only two conditions. The two conditions may be to allow beams to travel from port 1 to port 2 and from port 2 to port 3 such that beams enter and exit add/drop circulators 212 in an asymmetrical manner. By eliminating this extra functionality some of the more expensive components that are necessary in manufacturing traditional optical circulators may be reduced or eliminated. Accordingly, the use of add/drop circulators may be economically preferred over traditional circulators.

Add/drop circulators 212 may receive drop traffic at their input ports from splitters 214. Similar to add/drop circulators 212 and MUXs 210, each splitter 214 may be associated with a different degree of system 200. Accordingly, each splitter 214 may be coupled to the input port of the add/drop circulator associated with the same degree. For example, splitter 214a and add/drop circulator 212a may both be associated with the first degree of system 200, and splitter 214a may be coupled to the input port of add/drop circulator 212a such that splitter 214a sends traffic to add/drop circulator 212a.

Splitters 214 represent optical couplers or any other suitable optical component configured to split an optical beam into multiple copies of the optical beam and transmit the copies to other components within system 200. In operation, each splitter 214 in system 200 may receive a WDM or other multi-channel input optical beam from mesh network 10 at the fiber 21 associated with its respective degree. Each Splitter 214 may split the received input beam into several copies. A copy of the input beam is sent to each WSS 216 (where some or all of the channels may be passed through system 200 to mesh network 10) and also transmitted to the add/drop circulator 212 associated with the splitter 214 (where some or all of the channels may be dropped at system 200).

For example, splitter 214a may receive a beam carrying traffic from network 10 via fiber 21a (which may be associated with the first degree of system 200 and network 10). Splitter 214a may split the received beam into several copies and may send a copy of the beam to each WSS 216 (WSSs 216a-216n) and may also send a copy of the beam to the input port of add/drop circulator 212a, to allow for some or all of the channels of the input beam to be dropped.

WSSs 216 may comprise any suitable optical components configured to receive multiple optical beams and output a portion or all of one or more of the received beams. Similar to splitters 214, each WSS 216 may be associated with a different degree of system 200. As noted above, each WSS 216 may receive a copy of traffic from each splitter 214, also each WSS 216 may be configured to add traffic to their respective degree, by receiving add traffic from the add/drop circulator associated with the degree. For example, WSS 216a may receive, via fiber 21a, copies of traffic from splitters 214a-214n to be transmitted over the first degree. WSS 216a may also be coupled to the output port of add/drop circulator 212a and may receive add traffic from add/drop circulator 212a. WSS 216a may add and send the add traffic received from add/drop circulator 212a through the first degree via fiber 23a.

The use of add/drop circulators 206 and 212 in the architecture of system 200 may allow for a less expensive implementation of a colorless and directionless system 200, thus satisfying the ever increasing demands of optical networks while reducing costs.

Modifications, additions, or omissions may be made to system 200 illustrated in FIG. 2. For example, splitters 214 may be replaced with WSSs. System 200 may include any suitable number of MUXs 210, add/drop circulators 212, splitters 214 and WSSs 216 to handle any suitable number of degrees of system 200. Additionally, system 200 may include any suitable number of add/drop circulators 206, add ports 202 and drop ports 204 to handle the adding and dropping of beams. As yet another example, system 200 may include more cross-connects 208 according the design of network 10 if traffic is to be added from and dropped to multiple paths, such as an east path and west path of a ring network.

Figure 3:
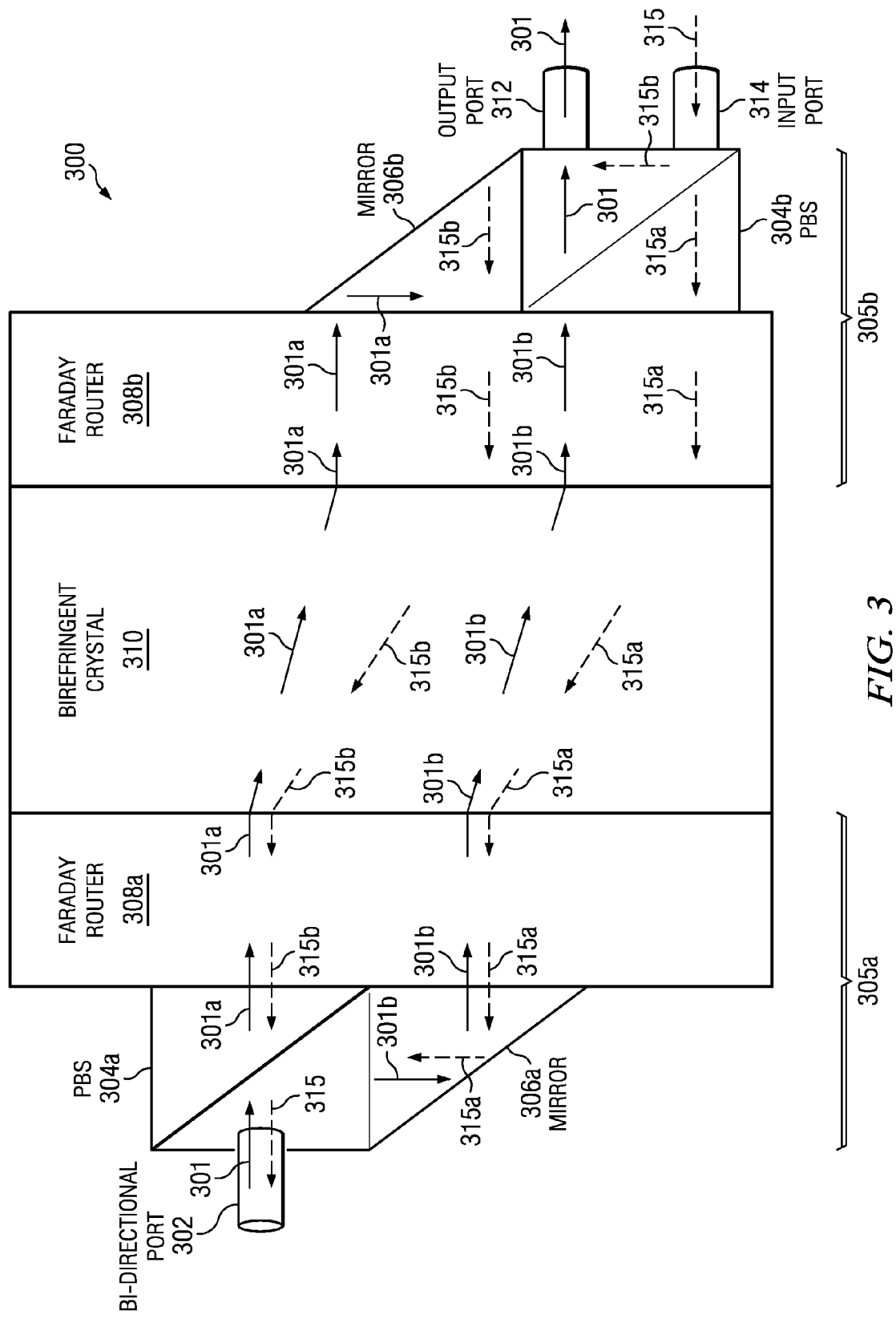
FIG. 3 illustrates an example embodiment of an add/drop circulator.

FIG. 3 illustrates an example embodiment of an add/drop circulator 300 that may be used as an add/drop circulator 206 or 212 depicted in FIG. 2.

Add/drop circulator 300 may include a bi-directional port 302, polarization beam splitters (PBSs) 304, mirrors 306, polarization rotators 308, birefringent crystal 310, output port 312, and input port 314. Add/drop circulator 300 may be configured to direct eastward beam 301 carrying eastward traffic and westward beam 315 carrying westward traffic, such that eastward beam 301 received at bi-directional port 302 exit add/drop circulator 300 at output port 312, and westward beam 315 received at input port 314 exit add/drop circulator 300 at bi-directional port 302. Accordingly, add/drop circulator 300 may be used to interface two opposite, uni-directional paths with a single bi-directional path. The terms "eastward" and "westward" do not refer to specific geographical directions, but are merely used to express the idea that eastward beam 301 and westward beam 315 are traveling in opposite directions in add/drop circulator 300.

In the present embodiment, add/drop circulator 300 may receive an eastward beam 301 at bi-directional port 302. Bi-directional port 302 may comprise any suitable interface for coupling add/drop circulator 300 to another network component. Additionally, bi-directional port 302 may be configured to allow both eastward and westward travelling beams to pass through it. For example, bi-directional port 302 may comprise an interface between an optical fiber and add/drop circulator 300. Bi-directional port 302 may be configured to provide this interface to add/drop circulator 300 via optical beam manipulation system 305a. Bi-directional port 302 may also be configured to receive eastward beam 301 from another network component to have eastward beam 301 sent through add/drop circulator 300.

Beam manipulation system 305a may comprise any suitable system, apparatus or device configured to split eastward beam 301 according to the polarization components of eastward beam 301. The polarization of an optical signal may refer to the direction of the oscillations of the optical signal. The term "polarization" may generally refer to the path traced out by the tip of the electric field vector at a point in space, which is perpendicular to the propagation direction of the optical signal. The term "linear polarization" may generally refer to a constant direction of the orientation of the electric field vector. Generally, an arbitrary linearly polarized wave can be resolved into two independent orthogonal (perpendicular) components. These components may be referred to as vertical polarization components and horizontal polarization components. It is understood that the terms "vertical polarization" and "horizontal polarization" as used in the present disclosure are used to provide a frame of reference for showing the perpendicular relationship between the two polarization components. The terms are not limited to any particular polarization orientation.

In the present example, beam manipulation system 305a may include PBS 304a configured to split eastward beam 301. PBS 304a may be configured to split an optical beam according to its horizontal and vertical components such that the optical beam is divided into two beams—one beam being vertically polarized and the other beam being horizontally polarized. Accordingly, PBS 304a may divide eastward beam 301 according to its horizontal and vertical polarization components into eastward beams 301a and 301b. In the present example, eastward beam 301a may leave PBS 304a being vertically polarized and eastward beam 301b may leave PBS 304a being horizontally polarized.

Beam manipulation system 305a may also comprise any suitable system, apparatus or device configured to direct eastward beams 301a and 301b toward birefringent crystal 310. Additionally, beam manipulation system 305a may include any suitable system, apparatus or device configured to change the polarization of at least one of eastward beams 301a and 301b such that the polarizations of eastward beams 301a and 301b are substantially equal upon entering birefringent crystal 310.

In the illustrated embodiment, beam manipulation system 305a may also include mirror 306a and polarization rotator 308a. PBS 304a may be configured to direct eastward beam 301b toward mirror 306a. Mirror 306a may be configured to reflect eastward beam 301b such that the polarization of eastward beam 301b changes from horizontal polarization to vertical polarization. As noted above, eastward beam 301a may also be vertically polarized at this point, and therefore the polarizations of eastward beams 301a and 301b may be substantially equal upon eastward beam 301b being reflected by mirror 306a. Mirror 306a may also be configured to direct eastward beam 301b such that it is traveling parallel to eastward beam 301a.

Beam manipulation system 305a of add/drop circulator 300 may also include polarization rotator 308a optically coupled to PBS 304a and mirror 306a and configured to receive eastward beams 301a and 301b from PBS 304a and mirror 306a. Polarization rotator 308a may be any system, apparatus or device configured to rotate the polarization of eastward and westward beams entering the rotator in opposite directions. In the present example, polarization rotator 308a may comprise a Faraday rotator. In the present example, polarization rotator 308a may be configured to rotate the polarization of eastward beams 301a and 301b approximately forty-five degrees. For example, if eastward beams 301a and 301b are vertically polarized, polarization rotator 308a may rotate the polarization of eastward beams 301a and 301b forty-five degrees, such that the polarization of eastward beams 301a and 301b is half-way between vertical and horizontal polarization.

Although, the present example describes eastward beam 301 traveling in specific directions, having specific polarizations, the present disclosure should not be limited to such. The present example is for illustrative purposes only. Additionally, although the manipulation of eastward beam 301 by PBS 304a and mirror 306a of beam manipulation system 305a are depicted in a specific manner, PBS 304a may comprise any system, apparatus or device configured to split eastward beam 301 into eastward beams 301a and 301b according to the polarization of eastward beams 301a and 301b. Also, mirror 306a may comprise any system apparatus or device configured to manipulate eastward beams 301a and 301b such that they have the same polarization and are traveling parallel to each other.

For example, PBS 304a may comprise a Wollaston prism configured to split eastward beam 301 into eastward beams 301a and 301b according to the horizontal and vertical polarization components of eastward beam 301. Additionally, mirror 306a may comprise a plurality of mirrors configured to manipulate the polarization and direction of eastward beams 301a and 301b from the Wollaston prism such that eastward beams 301a and 301b have the same polarization and are traveling parallel to each other.

Figure 4:
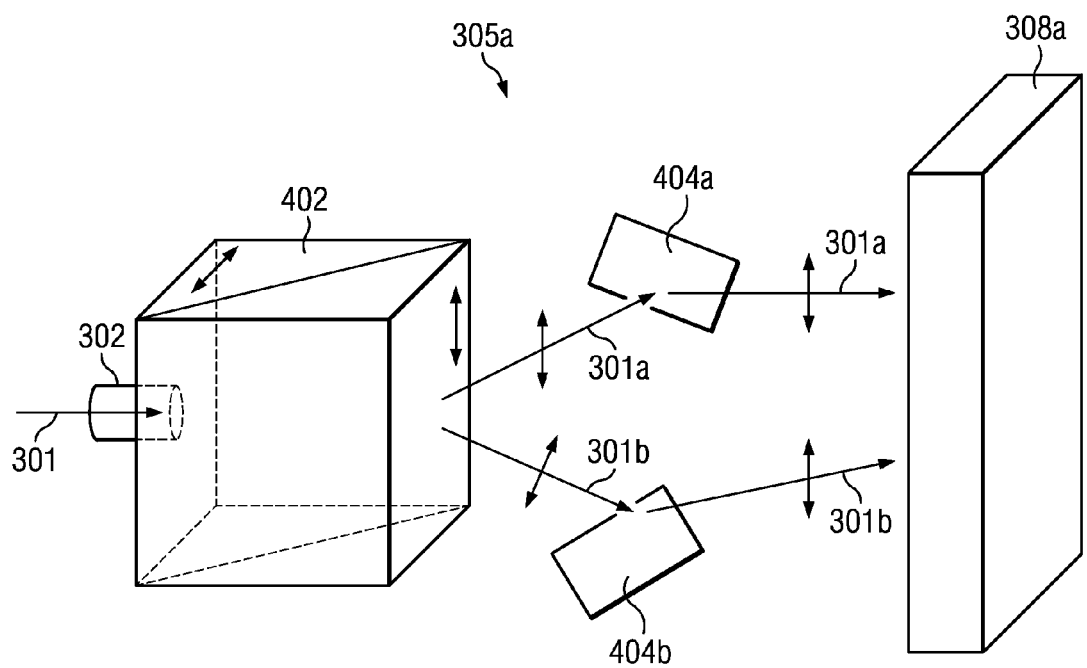
FIG. 4 depicts an example beam manipulation system that comprises a Wollaston prism and a plurality of mirrors.

FIG. 4 depicts an example of a beam manipulation system 305a that comprises a Wollaston prism 402 and a plurality of mirrors (e.g. mirrors 404a and 404b) for beam manipulation. Wollaston prism 402 may be configured to split optical beams according to their horizontal and vertical polarization components. Wollaston prism 402 may be configured to direct the vertically polarized beams toward mirror 404a and the horizontally polarized beams toward mirror 404b.

Mirror 404a may be configured to receive the vertically polarized beams leaving Wollaston prism 402. Mirror 404a may be configured to maintain the vertical polarization of the vertically polarized beams leaving Wollaston prism 402 and may direct the vertically polarized beams in the proper direction. Mirror 404b may be configured to receive the horizontally polarized beams, and may be oriented such that the horizontally polarized beams leaving Wollaston prism 402 may have a vertical polarization after being reflected by mirror 404b and direct the beams in the proper direction. Mirrors 404a and 404b may also be configured such that the beams they reflect travel parallel to each other. Accordingly, Wollaston prism 402 and mirrors 404a and 404b may be configured to split a beam according to its polarization components, change the polarization of at least one of the beams such that the polarization is the same for both beams and direct the two beams to travel parallel to each other.

In an embodiment where PBS 304a comprises Wollaston prism 402 and mirror 306a comprises mirrors 404a and 404b, eastward beam 301 may enter Wollaston prism 402, and Wollaston prism 402 may divide eastward beam 301 into horizontally polarized eastward beam 301b and vertically polarized eastward beam 301a. Mirror 404a may be configured to reflect eastward beam 301a and maintain the vertical polarization of eastward beam 301a. Mirror 404b may be configured to reflect eastward beam 301b such that the polarization of eastward beam 301b changes from horizontal to vertical polarization. Additionally, mirrors 404a and 404b may be configured such that eastward beams 301a and 301b are both vertically polarized and traveling parallel to each other toward polarization rotator 308a. Polarization rotator 308a will be further described with respect to FIG. 3.

Modifications, additions or omissions may be made to system 305a without departing from the scope of the disclosure. For example, mirror 404a may be configured to change the polarization of the vertically polarized beams leaving Wollaston prism 402 such that they are horizontally polarized and mirror 404b may be configured to maintain the horizontal polarization of the beams it receives. Additionally, as mentioned above, the particular polarization orientations and directions described are merely to provide a frame of reference for the disclosure.

Returning to FIG. 3, in the present example, birefringent crystal 310 may be optically coupled to polarization rotator 308a and may be configured to receive eastward beams 301a and 301b from polarization rotator 308a. Birefringent crystal 310 may be any suitable apparatus, system or device configured to refract optical beams according to the polarization of the optical beams. In the present example, birefringent crystal 310 may be configured to refract eastward beams 301a and 301b, according to the polarization of eastward beams 301a and 301b, such that eastward beams 301a and 301b may exit add/drop circulator 300 at output port 312.

Due to the refraction of eastward beams 301a and 301b by birefringent crystal 310—according to the polarizations of eastward beams 301a and 301b—birefringent crystal 310 may be configured according to the polarizations of eastward beams 301a and 301b upon eastward beams 301a and 301b entering birefringent crystal 310. Therefore the configuration of beam manipulation system 305a and birefringent crystal 310 may depend on each other due to beam manipulation system 305a manipulating the polarizations of eastward beams 301a and 301b before eastward beams 301a and 301b enter birefringent crystal 310.

Additionally, the particular polarizations of eastward beams 301a and 301b and the particular effect of birefringent crystal 310 on eastward beams 301a and 301b according to their polarizations are not limited to the present disclosure. The particular polarizations and effect of birefringent crystal 310 on eastward beams 301a and 301b, according to the polarizations as described, are merely to show the relationship between birefringent crystal 310, beam manipulation system 305a and the polarization of eastward beams 301a and 301b. Add/drop circulator 300 may also include beam manipulation system 305b configured to receive eastward beams 301a and 301b from birefringent crystal 310 and also configured to direct eastward beams 301a and 301b toward output port 312. Beam manipulation system 305b may also be configured to combine eastward beams 301a and 301b into a single eastward output beam 301 that leaves add/drop circulator 300 at output port 312.

Beam manipulation system 305b may include polarization rotator 308b optically coupled to birefringent crystal 310 and configured to receive eastward beams 301a and 301b from birefringent crystal 310. Polarization rotator 308b like polarization rotator 308a may be any system, apparatus or device configured to rotate the polarization of eastward and westward beams in opposite directions. In some embodiments, polarization rotator 308b may comprise a Faraday rotator. In the present example, polarization rotator 308b may be configured to continue rotating the polarization of eastward beams 301a and 301b approximately another forty-five degrees after eastward beams 301a and 301b leave birefringent crystal 310. For example, if polarization rotator 308a rotates the polarization of eastward beams 301a and 301b, having vertical polarization, forty-five degrees such that eastward beams 301a and 301b have a polarization half-way between vertical polarization and horizontal polarization, polarization rotator 308b may rotate eastward beams 301a and 301b another forty-five degrees such that eastward beams 301a and 301b have only a horizontal polarization.

Beam manipulation system 305b may also include PBS 304b and mirror 306b optically coupled to polarization rotator 308b and configured to receive at least one of eastward beams 301a and 301b from polarization rotator 308b. Mirror 306b may be any suitable, system, apparatus or device configured to direct eastward beams 301a and 301b toward each other and toward PBS 304b. Additionally mirror 306b may be configured such that the polarization of either beam 301a or 301b changes from being horizontally polarized to being vertically polarized upon being reflected by mirror 306b. In the present example, mirror 306b may be configured to receive eastward beam 301a and reflect eastward beam 301a toward eastward beam 301b and PBS 304b. Mirror 306b may also be configured to change the polarization of eastward beam 301a from horizontal polarization to vertical polarization. Additionally, in the present illustration, eastward beam 301b may already be traveling along the proper trajectory toward PBS 304b and output port 312, with the proper polarization such that mirror 306b may not need to manipulate the trajectory or polarization of eastward beam 301b.

In other embodiments, mirror 306b may comprise a plurality of mirrors configured to manipulate the trajectory and polarization of both eastward beams 301a and 301b to ensure that both eastward beams 301a and 301b are properly received by PBS 304b. For example, mirror 306b may comprise mirrors 504 and 506 in FIG. 5 as further discussed below.

PBS 304b may be configured to receive eastward beams 301a and 301b and combine them back into a single eastward beam 301. Accordingly, PBS 304b may act as a polarization beam combiner (PBC) with respect to eastward beams 301a and 301b.

Add/drop circulator 300 may also include an output port 312 optically coupled to PBS 304b and configured to allow eastward beam 301 to exit add/drop circulator after being combined by PBS 304b. Output port 312 may comprise any suitable interface between add/drop circulator 300 and another network component. In some embodiments, output port 312 may comprise an interface between PBS 304b and an optical fiber.

Similarly to PBS 304a, PBS 304b and mirror 306b may comprise any system apparatus or device configured to combine eastward beams 301a and 301b after eastward beams 301a and 301b leave polarization rotator 308b such that eastward beam 301 may exit add/drop circulator 300 at output port 312. For example, PBS 304b may comprise a Wollaston prism and mirror 306b may comprise a plurality of mirrors.

Figure 5:
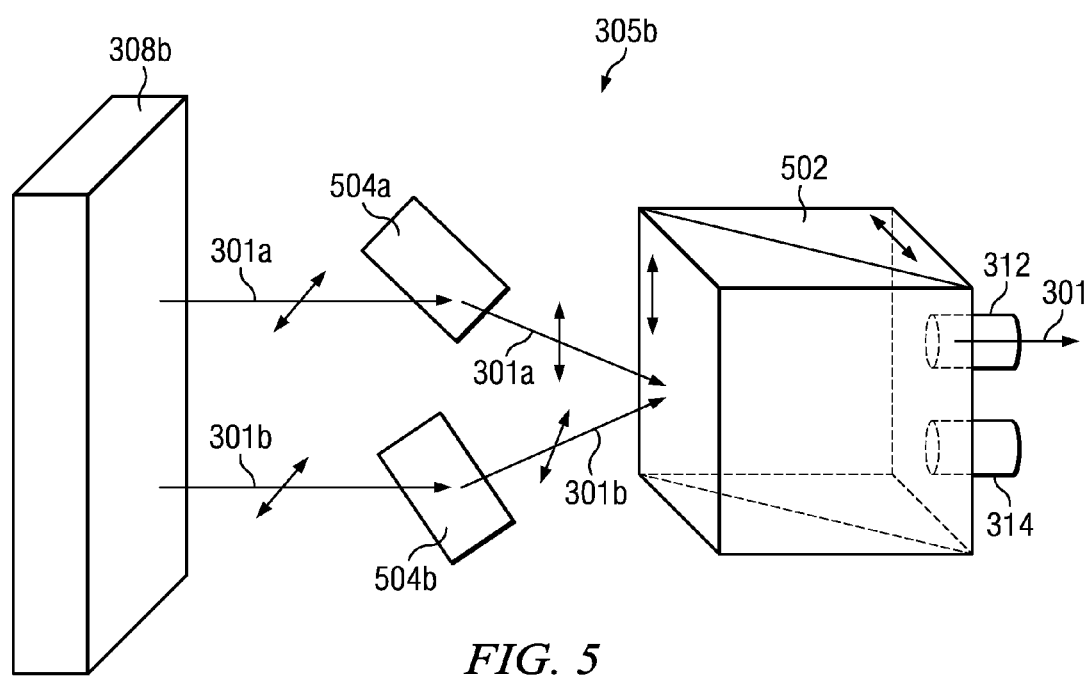
FIG. 5 depicts another example of a beam manipulation system that comprises a Wollaston prism and a plurality of mirrors.

FIG. 5 depicts an example beam manipulation system 305b that comprises a Wollaston prism 502 and a plurality of mirrors (e.g. mirrors 504a and 504b) configured to combine eastward beams 301a and 301b.

System 301b may include mirrors 504a and 504b optically coupled to polarization rotator 308b. Mirror 504a may be configured to receive horizontally polarized eastward beam 301a from polarization rotator 308b. Mirror 504a may be configured to reflect eastward beam 301a toward Wollaston prism 502 and output port 312 coupled to Wollaston prism 502. Mirror 504a may also be configured such that upon reflecting eastward beam 301a, the polarization of eastward beam 301a changes from horizontal polarization to vertical polarization.

Mirror 504b may be configured to receive horizontally polarized eastward beam 301b from polarization rotator 308b. Mirror 504b may be configured to reflect eastward beam 301b toward Wollaston prism 502 and output port 312 coupled to Wollaston prism 502 also. Mirror 504b may additionally be configured such that it maintains the horizontal polarization of eastward beam 301b upon reflecting eastward beam 301b.

Wollaston prism 502 may be configured to receive vertically polarized eastward beam 301a and horizontally polarized eastward beam 301b and combine them into a single signal 301. Wollaston prism 302 may be configured to direct signal 301 through output port 312 optically coupled to Wollaston prism 302.

Modifications, additions or omissions may be made to FIG. 5 without departing from the scope of the present disclosure. For example, the specific polarizations and trajectory of eastward beam 301 are for illustrative purposes only and may vary according to the specific implementation and application. Additionally, the location of output port 312 may also vary.

Returning to FIG. 3, add/drop circulator 300 may also include an input port 314 configured to receive westward beam 315. In the present example, westward beam 315 may travel in the opposite direction of eastward beam 301, and similar to eastward beam 301, westward beam 315 may include a polarization state that comprises horizontal and vertical polarization components.

Beam manipulation system 305b may also be configured to split westward beam 315 according to its horizontal and vertical polarization components. PBS 304b may be configured to split westward beam 315 into horizontally polarized westward beam 315a and vertically polarized westward beam 315b. In the present illustration, PBS 304b may be configured to direct westward beam 315b toward mirror 306b and westward beam 315a toward polarization rotator 308b. Accordingly, in the present example, mirror 306b may direct westward beam 315b toward polarization rotator 308b also such that westward beams 315a and 315b are parallel to each other. Mirror 306b may also be configured to change the polarization of westward beam 315b from being vertically polarized to being horizontally polarized, such that westward beams 315a and 315b are both horizontally polarized upon entering polarization rotator 308b.

As previously mentioned and described with respect to FIG. 5, PBS 304b of beam manipulation system 305b may comprise a Wollaston prism and mirror 306b of beam manipulation system 305b may comprise a plurality of mirrors, such as mirrors 504a and 504b.

Figure 6:
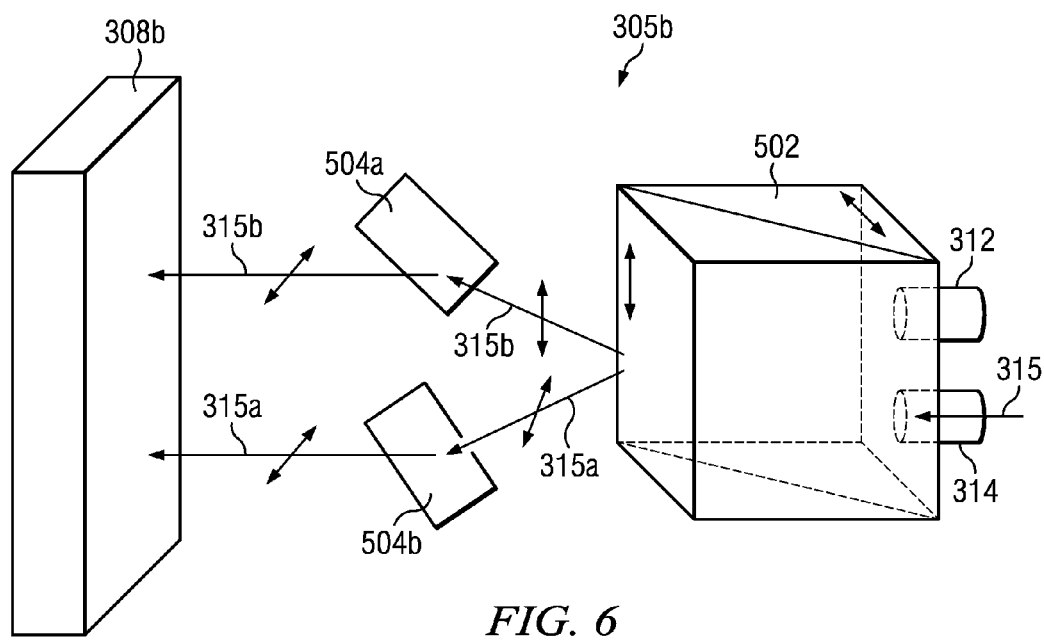
FIG. 6 depicts an example of how the beam manipulation system depicted in FIG. 5 may adjust a beam.

FIG. 6 depicts an example of how beam manipulation system 305b depicted in FIG. 5 may manipulate a westward beam 315. Wollaston prism 502 may include input port 314 configured to receive a westward beam 315. Wollaston prism 502 may be configured to split westward beam 315 according to its horizontal and vertical polarization components. Accordingly, Wollaston prism 502 may split westward beam 315 into a horizontally polarized westward beam 315a and a vertically polarized westward beam 315b. Wollaston prism 502 may also be configured to direct westward beam 315b toward mirror 504a and westward beam 315a toward mirror 504b.

Mirror 504a may be optically coupled to Wollaston prism 502 and may be configured to receive vertically polarized westward beam 315b. Mirror 504a may be configured to reflect westward beam 315b toward polarization rotator 308b. Mirror 504a may also be configured to change the polarization of westward beam 315b from being vertically polarized to being horizontally polarized. Accordingly, upon being reflected by mirror 504a, westward beam 315b may be horizontally polarized and directed toward polarization rotator 308b.

Mirror 504b may be optically coupled to Wollaston prism 502 and may be configured to receive horizontally polarized westward beam 315a. Mirror 504b may be configured to reflect westward beam 315a toward polarization rotator 308b. Mirror 504b may also be configured such that when it reflects westward beam 315a, westward beam 315a maintains its horizontal polarization. Accordingly, upon being reflected by mirror 504b, westward beam 315a may be horizontally polarized and directed toward polarization rotator 308b.

Mirrors 504a and 504b may be configured such that westward beam 315b and 315a are traveling parallel to each other toward polarization rotator 308a. Additionally, as discussed above, both westward beams 315a and 315b may be horizontally polarized upon reaching polarization rotator 308b. Accordingly, system 305b may be configured to split westward beam 315 into westward beams 315a and 315b. Additionally, system 305b may be configured to manipulate the trajectories and polarization of westward beams 315a and 315b as they travel toward polarization rotator 308b.

Returning to FIG. 3, polarization rotator 308b may be configured to rotate the polarization of westward beams 315a and 315b approximately forty-five degrees, before westward beams 315a and 315b enter birefringent crystal 310. For example, polarization rotator 308b may rotate westward beams 315a and 315b such that the polarization of westward beams 315a and 315b are half-way between the horizontal and vertical polarizations, similar to how polarization rotator 308a rotates eastward beams 301a and 301b.

Polarization rotator 308b and polarization rotator 308a may rotate the polarizations of westward beams 315a and 315b and eastward beams 301a and 301b respectively, such that the polarizations of westward beams 315a and 315b are oriented perpendicular to the polarizations of eastward beams 301a and 301b, as eastward beams 301a and 301b and westward beams 315a and 315b enter birefringent crystal 310. As noted earlier, birefringent crystal 310 may refract beams according to the polarization of the beams passing through it. Accordingly, eastward beams 301a and 301b and westward beams 315a and 315b may be refracted differently within birefringent crystal 310 because of their differing polarizations. Thus, birefringent crystal 310 may be oriented such that eastward beams 301a and 301b incident to birefringent crystal 310 produce an ordinary wave as they pass through birefringent crystal 310, while westward beams 315a and 315 produce an extraordinary wave as they pass through birefringent crystal 310, or vice versa.

In order for eastward beams 301a and 301b and westward beams 315a and 315b to utilize the same port (bi-directional port 302) on one side of add/drop circulator 300 and utilize different ports (output port 312 and input port 314) on the other side of add/drop circulator 300, add/drop circulator 300 may direct eastward beams 301a and 301b and westward beams 315a and 315b differently as the beams pass through add/drop circulator 300. The different refractions between eastward beams 301a and 301b and westward beams 315a and 315b in birefringent crystal 310, due to the different polarization orientations, allows for this to happen. Accordingly, birefringent crystal 310 may be configured to refract westward beams 315a and 315b, according to the polarization of westward beams 315a and 315b, such that westward beams 315a and 315b may exit add/drop circulator 300 at bi-directional port 302.

Therefore, beam manipulation systems 305a and 305b may be configured to manipulate the polarizations and trajectories of eastward beams 301a and 301b, and westward beams 315a and 315b such that birefringent crystal 310 may direct eastward beams 301a and 301b and westward beams 315a and 315b appropriately. Additionally, the relationship between beam manipulation systems 305a and 305b with birefringent crystal 310 allows for add/drop circulator 300 to utilize only one birefringent crystal 310, which may be an expensive component of add/drop circulator 300. Traditional optical circulators utilize at least two birefringent crystals; therefore, add/drop circulator 300 may be more economical than a traditional optical circulator.

Polarization rotator 308a may be configured to rotate the polarization of westward beams 315a and 315b approximately another forty-five degrees after westward beams 315a and 315b exit birefringent crystal 310. In the present example, polarization rotator 308a may rotate the polarization of westward beams 315a and 315b another forty-five degrees such that the westward beams 315a and 315b are only vertically polarized.

Westward beam 315a may be reflected by mirror 306a toward westward beam 315b and PBS 304a, similar to how mirror 306b may reflect eastward beam 301a toward eastward beam 301b and PBS 304b. Additionally, mirror 306a may change the polarization of beams 315a from a vertical to horizontal polarization, to allow PBS 304a to combine westward beams 315a and 315b. Accordingly, PBS 304a may act as a polarization beam combiner to westward beams 315a and 315b.

Once again, in an embodiment wherein PBS 304a comprises a Wollaston prism and mirror 306a comprises a plurality of mirrors, westward beams 315a and 315b may both be directed by mirror 306a toward PBS 304a to be combined.

Figure 7:
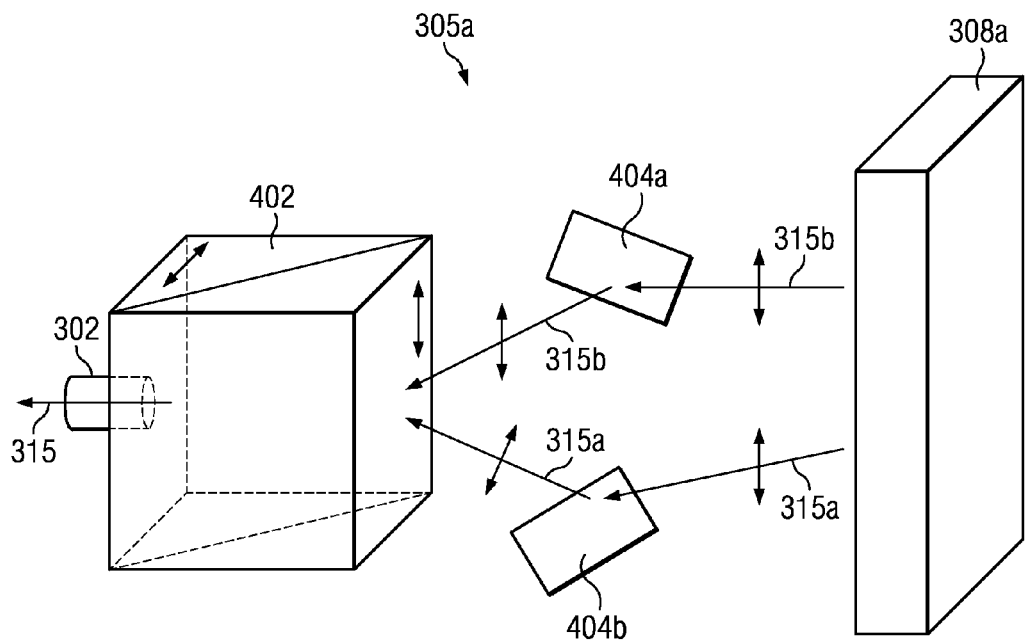
FIG. 7 depicts an example of how the beam manipulation system depicted in FIG. 4 may adjust a beam.

FIG. 7 depicts an example of how beam manipulation system 305a depicted in FIG. 4 comprising a Wollaston prism and a plurality of mirrors may manipulate westward beams 315a and 315b. As mentioned above, mirrors 404a and 404b included in system 305a may be optically coupled to polarization rotator 308a. Mirror 404a may be configured to receive vertically polarized westward beam 315b from polarization rotator 308a. Additionally, mirror 404b may be configured to receive vertically polarized westward beam 315a from polarization rotator 308a.

Mirror 404a may be configured to reflect westward beam 315b toward Wollaston prism 402 and bi-directional port 302 coupled to Wollaston prism 402. Mirror 404a may also be configured such that westward beam 315b maintains its vertical polarization upon being reflected by mirror 404a.

Mirror 404b may be configured to reflect westward beam 315a toward Wollaston prism 402 and bi-directional port 302 also. Unlike mirror 404a which is configured to maintain the vertical polarization of westward beam 315b, mirror 404b may be configured such that westward beam 315a changes from being vertically polarized to being horizontally polarized upon being reflected by mirror 404b. Accordingly, mirror 404b may direct a horizontally polarized westward beam 315a toward Wollaston prism 402. As mentioned earlier, the terms "horizontal and vertical polarization" are used merely to provide a frame of reference that the two polarizations are perpendicular to each other. Accordingly, mirrors 404a and 404b are merely configured such that westward beams 315a and 315b have perpendicular polarizations and converge at the proper angle to be combined by Wollaston prism 402.

Wollaston prism 402 may be configured to receive horizontally and vertically polarized westward beams 315a and 315b and combine them into a single westward beam 315. Accordingly, Wollaston prism 402 may be configured as a polarization beam combiner of westward beams 315a and 315b.

Modifications, additions and omissions may be made to systems 300, 305a and 305b without departing from the scope of the present disclosure. For example, eastward beams 301a and 301b are described as being vertically polarized upon reaching polarization rotator 308a and westward beams 315a and 315b are described as being horizontally polarized upon reaching polarization rotator 308b, but the polarizations of eastward and westward beams 301a and 301b, and 315a and 315b may be reversed without departing from the scope of the present disclosure. Additionally, the direction of travel by each beam is depicted for illustrative purposes to show how the beams may be manipulated by the various elements of add/drop circulator 300, but the actual trajectory of the beams may be different from that depicted.

Figure 8:
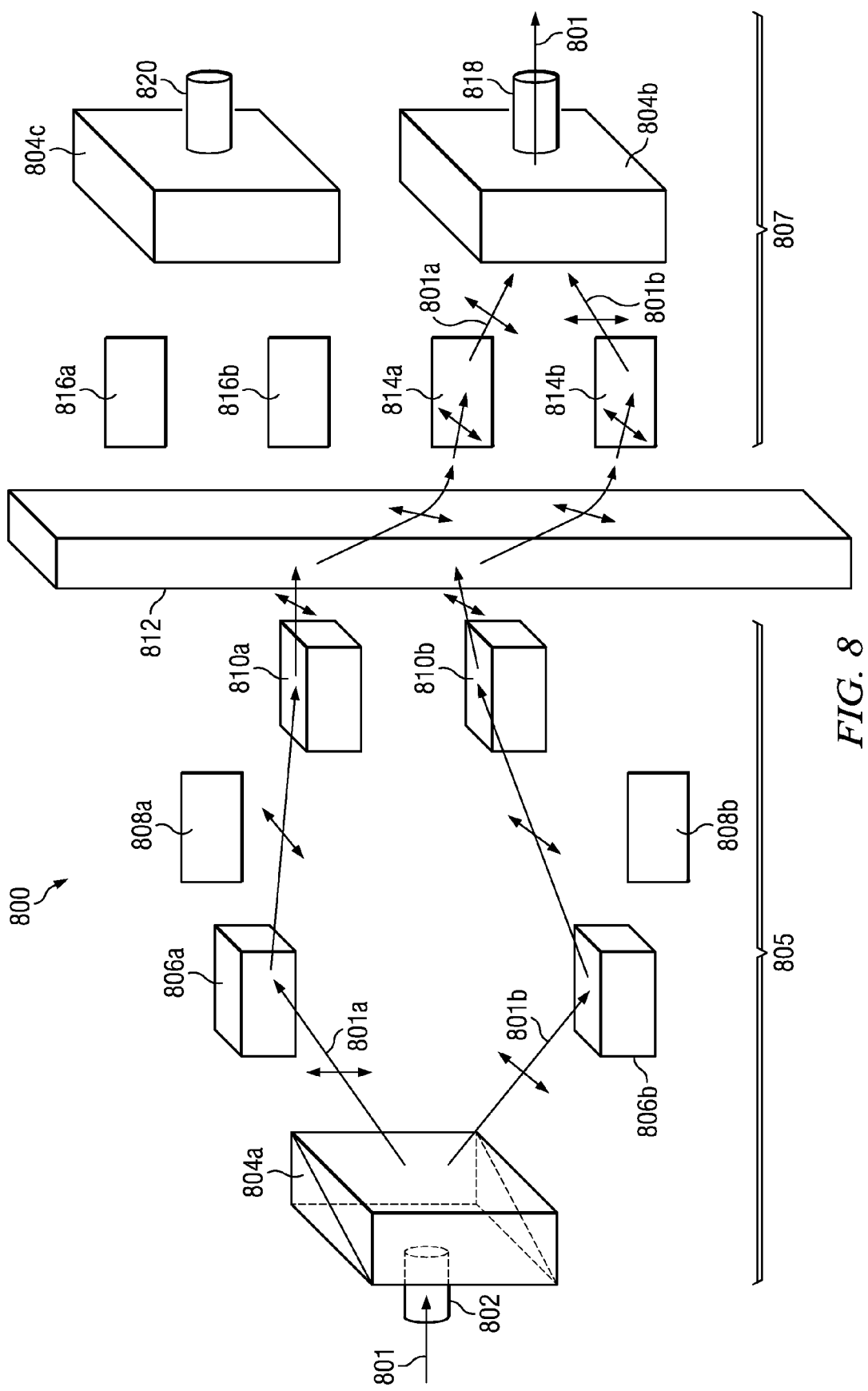
FIG. 8 depicts another example embodiment of an add/drop circulator.

FIG. 8 depicts another example embodiment of an add/drop circulator 800 that may be used as an add/drop circulator 206 or 212 as depicted in FIG. 2. Add/drop circulator 800 may include a bi-directional port 802, a beam manipulation system 805 that comprises PBS 804a, partially reflective prisms 806 and 810 and mirrors 808. Add/drop circulator 800 may also include a birefringent crystal 812 and a beam manipulation system 805b that comprises mirrors 814 and 816, and PBS's 804b and 804c. Additionally, add/drop circulator 800 may include an output port 818 and an input port 820. FIG. 8 also illustrates the path of an eastward beam 801 entering add/drop circulator 800 at bi-directional port 802 and exiting add/drop circulator 800 at output port 818.

Bi-directional port 802 may be substantially similar to bi-directional port 302 of add/drop circulator 300. Bi-directional port 802 may be configured to receive an eastward beam 801 similar to eastward beam 301 described with respect to FIGS. 3-5.

Add/drop circulator 800 may also comprise beam manipulation system 805a that includes PBS 804a coupled to bi-directional port 802. PBS 804a may be any suitable apparatus, system or device configured to split an eastward beam 801 according to its horizontal and vertical polarizations into a vertically polarized eastward beam 801a and a horizontally polarized eastward beam 801b. In some embodiments PBS 804a may comprise a Wollaston prism. PBS 804a may be configured to direct eastward beam 801a toward partially reflective prism 806a. Additionally, PBS 804a may be configured to direct eastward beam 801b toward partially reflective prism 806b.

Partially reflective prisms 806 may also be included in beam manipulation system 805 and may comprise any suitable system, apparatus or device configured to reflect beams traveling in one direction while allowing beams traveling in another direction to pass through them. In the present example, partially reflective prisms 806 may be configured to reflect eastward travelling beams (e.g. eastward beams 801a and 801b), while allowing westward travelling beams (depicted in FIG. 9) to travel through them.

Partially reflective prism 806a may be configured to reflect eastward beam 801a toward partially reflective prism 810a. Partially reflective prism 806a may also be configured such that upon reflecting eastward beam 801a, eastward beam 801a changes from being vertically polarized to being horizontally polarized. Partially reflective prism 806b may be configured to reflect eastward beam 801b toward partially reflective prism 810b. Unlike partially reflective prism 806a, partially reflective prism 806b may be configured such that the horizontal polarization of eastward beam 801b is maintained upon being reflected by partially reflective prism 806a. Accordingly, after being reflected by partially reflective prisms 806a and 806b, eastward beams 801a and 801b may each be horizontally polarized.

Figure 9:
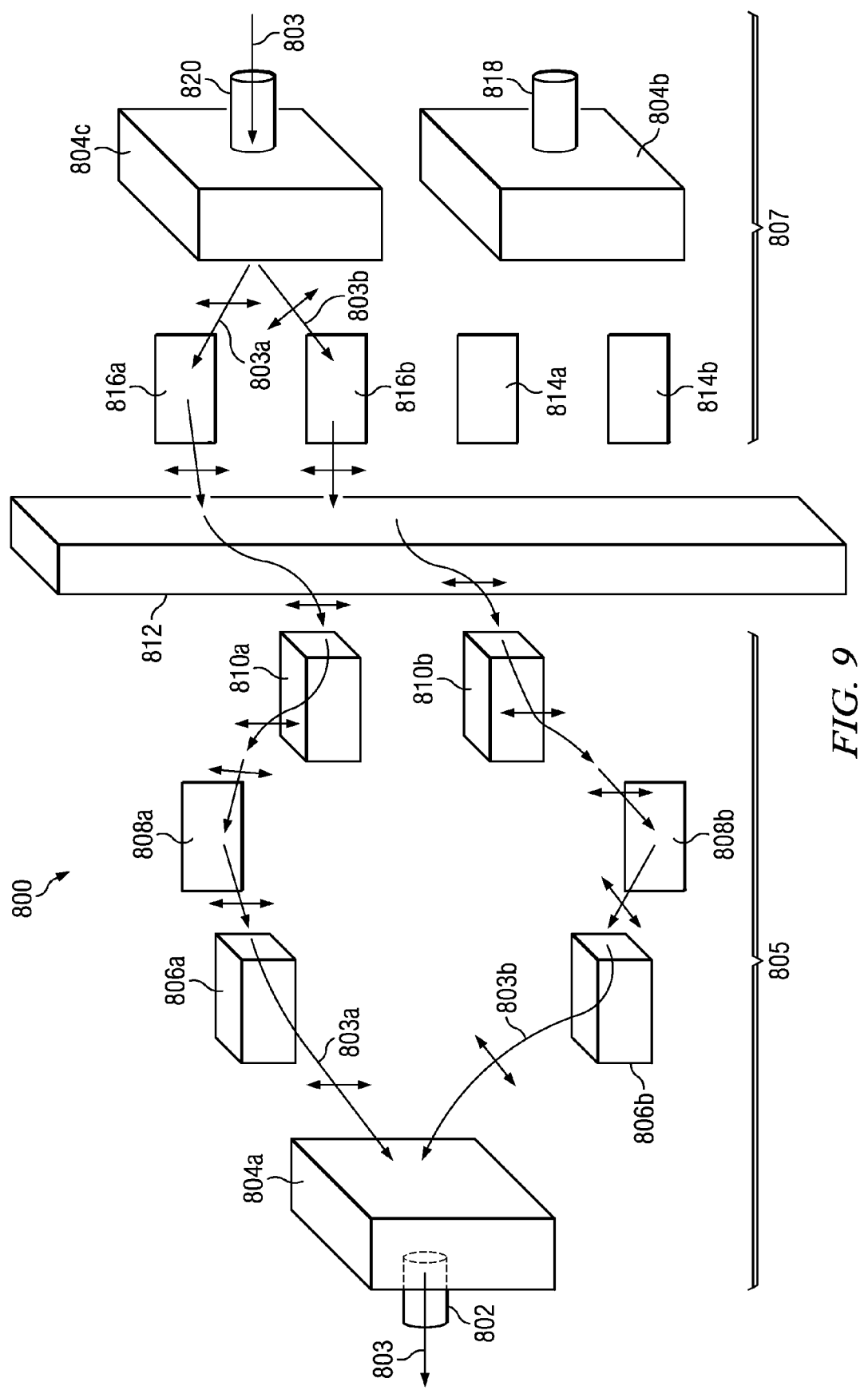
FIG. 9 illustrates the path of a beam entering the add/drop circulator of FIG. 8 at an input port of the add/drop circulator and exiting the add/drop circulator at the bi-directional port of the add/drop circulator.

Beam manipulation system 805 may also include mirrors 808a and 808b configured to receive and manipulate westward beams as further described with respect to FIG. 9. However, beam manipulation system 805 may be configured such that eastward beams 801a and 801b bypass mirrors 808a and 808b.

Beam manipulation system 805 may also include partially reflective prisms 810a and 810b configured to maintain the polarization of eastward beams 801a and 801b. Additionally partially reflective prism 810a may be configured to reflect eastward beam 801a toward birefringent crystal 812. Similar to partially reflective prisms 806, partially reflective prisms 810 may comprise any suitable system, apparatus or device configured to reflect beams traveling in one direction while allowing beams traveling in another direction to pass through them. In the present example, partially reflective prisms 810 may be configured to reflect eastward travelling beams (e.g. eastward beams 801*a* and 801*b*), while allowing westward travelling beams (depicted in FIG. 9) to travel through them.

Birefringent crystal 812 may be configured to direct the horizontally polarized eastward beams 801*a* and 801*b* respectively toward mirrors 814*a* and 814*b* of beam manipulation system 807 according to the horizontal polarization of eastward beams 801*a* and 801*b*.

Mirror 814*a* may be configured to reflect eastward beam 801*a* toward PBS 804*b* of beam manipulation system 807. Mirror 814*a* may also be configured to maintain the polarization of eastward beam 801*a*. Mirror 814*b* may be configured to reflect eastward beam 801*b* toward PBS 804*b*. Unlike mirror 814*a* however, mirror 814*b* may be configured to change the polarization of eastward beam 801*b* from horizontal polarization to vertical polarization.

PBS 804*b* may be configured to act as a polarization beam combiner of horizontally polarized eastward beam 801*a* and vertically polarized eastward beam 801*b* into a single eastward beam 801. PBS 804*b* may be any suitable apparatus, system or device configured to combine eastward beams 801*a* and 801*b*, for example PBS 804*b* may comprise a Wollaston prism. PBS 804*b* may also be configured such that the combined eastward beam 801 exits the prism at an output port 818. Accordingly, eastward beam 801 may enter add/drop circulator 800 at bi-directional port 802 and may exit add/drop circulator 800 at output port 818.

FIG. 9 illustrates the path of a westward beam 803 entering add/drop circulator 800 of FIG. 8 at input port 820 and exiting add/drop circulator 800 at bi-directional port 802.

Input port 820 may be configured to receive westward beam 803. Input port 820 may be coupled to PBS 804*c* of beam manipulation system 807 and may be configured to direct westward beam 803 into PBS 804*c*. PBS 804*c* may comprise any suitable system, apparatus or device configured to split westward beam 803 according to its vertical and horizontal polarization components such that westward beam 803 is divided into a vertically polarized westward beam 803*a* and a horizontally polarized westward beam 803*b*.

PBS 804*c* may be configured to direct westward beam 803*a* toward mirror 816*a*. PBS 804*c* may also be configured to direct westward beam 803*b* toward mirror 816*b*.

Mirror 816*a* may be configured to reflect westward beam 803*a* toward birefringent crystal 812. Mirror 816*a* may also be configured to maintain the vertical polarization of westward beam 803*a*. Mirror 816*b* may be configured to reflect westward beam 803*b* toward birefringent crystal 812. Mirror 816*b* may also be configured to change the polarization of westward beam 803*b* from horizontal to vertical polarization. Accordingly, after being respectively reflected by mirrors 816*a* and 816*b*, westward beams 803*a* and 803*b* may each be vertically polarized and traveling toward birefringent crystal 812.

Birefringent crystal 812 may be configured to direct the vertically polarized westward beams 803*a* and 803*b* toward partially reflective prisms 810*a* and 810*b* according to the polarization of westward beams 803*a* and 803*b*. As noted above, birefringent crystal 812 may be configured to direct horizontally eastward beams 801*a* and 801*b* toward mirrors 814*a* and 814*b* according to their polarization. Therefore, beam manipulation systems 805 and 807 may be configured similar to beam manipulation systems 305*a* and 305*b* to manipulate the polarizations and trajectories of eastward beams 801*a* and 801*b*, and westward beams 803*a* and 803*b* such that birefringent crystal 812 may direct eastward beams 801*a* and 801*b* and westward beams 803*a* and 803*b* appropriately. Additionally, the relationship between beam manipulation systems 305 and 307 with birefringent crystal 812 also allows for add/drop circulator 800 to utilize only one birefringent crystal 812.

Partially reflective prism 810*a* may be configured to allow westward beam 803*a* to pass through it and may also be configured to refract westward beam 803*a* toward mirror 808*a*. Partially reflective prism 810*b* may be configured to allow westward beam 803*b* to pass through it and may also be configured to refract westward beam 803*b* toward mirror 808*b*. Partially reflective prisms 810*a* and 810*b* may also be configured to maintain the vertical polarization of westward beams 803*a* and 803*b*.

Mirror 808*a* may be configured to reflect westward beam 803*a* toward partially reflective prism 806*a*. Mirror 808*a* may also be configured to maintain the vertical polarization of westward beam 803*a*. Mirror 808*b* may be configured to reflect westward beam 803*b* toward partially reflective prism 806*b*. Unlike mirror 808*a* with respect to westward beam 803*a*, mirror 808*b* may be configured to change the polarization of westward beam 803*b* from vertical polarization to horizontal polarization. Accordingly, after encountering mirrors 808*a* and 808*b*, westward beams 803*a* and 803*b* may be respectively vertically and horizontally polarized and respectively traveling toward partially reflective prisms 806*a* and 806*b*.

Partially reflective prism 806*a* may be configured to allow westward beam 803*a* to pass through it and may also be configured to refract westward beam 803*a* toward PBS 804*a*. Partially reflective prism 806*a* may also be configured to maintain the vertical polarization of westward beam 803*a*. Partially reflective prism 806*b* may be configured to allow westward beam 803*b* to pass through it and may also be configured to refract westward beam 803*b* toward PBS 804*a*. Partially reflective prism 806*b* may also be configured to maintain the horizontal polarization of westward beam 803*b*.

PBS 804*a* may be configured to combine westward beams 803*a* and 803*b* into a single westward beam 803. After westward beams 803*a* and 803*b* are combined into westward beam 803 by PBS 804*a*, PBS 804*a* may be configured such that westward beam 803 may exit add/drop circulator 800 at bi-directional port 802.

Modifications, additions or omissions may be made to add/drop circulator 800 described with respect to FIGS. 8 and 9 without departing from the scope of the present disclosure. For example, eastward beam 801 and westward beam 803 are described as having particular polarizations and traveling in particular directions, however the directions and polarizations are used merely to give a frame of reference of the polarizations and directions of eastward beam 801 and westward beam 803 with respect to each other. The actual polarizations and directions of travel may vary without departing from the scope of the present disclosure. Additionally the actual orientation and relative size of the various components within add/drop circulator 800 may differ from that depicted.

Figure 10:
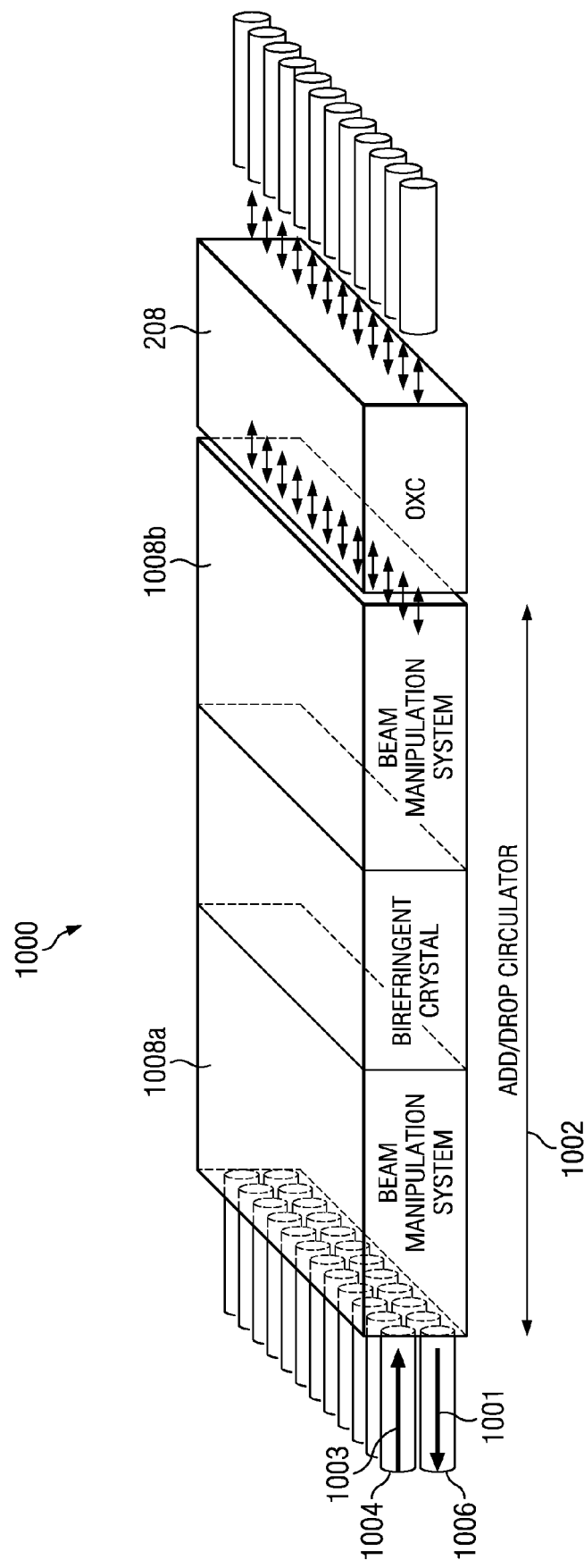
FIG. 10 illustrates an example system that integrates a plurality of add/drop circulators with an optical cross connect.

FIG. 10 illustrates an example system 1000 that integrates a plurality of add/drop circulators with an optical cross connect. System 1000 may be part of a node of an optical network, such as a four degree system 200 (e.g., node 20) depicted and described with respect to FIGS. 1 and 2.

System 1000 may include add/drop circulator 1002. Add/drop circulator 1002 may be configured to act as a plurality of add/drop circulators, such as add/drop circulators 206 depicted in FIG. 2. For example, add/drop circulator 1002 may be configured to act as add/drop circulators 206*a*-206*m* depicted in FIG. 2, such that a single add/drop circulator 1002 may be used instead of a plurality of add/drop circulators such as add/drop circulators 206a-206m. Accordingly, add/drop circulator 1002 may be configured to receive a plurality of eastward beams 1001 and westward beams 10003 at the same time and each element within add/drop circulator 1002 may be configured to perform its respective functions on each of the plurality of beams. Therefore a plurality of eastward beams 1001 and westward beams 1003 may share one "wide" add/drop circulator 1002.

Add/drop circulator 1002 may comprise a plurality of input and output ports coupled to a beam manipulation system 1008a. The plurality of input ports may be configured to each receive one of the plurality of westward beams 1003 and the plurality of output ports may each be configured to output each of one of the plurality of eastward beams 1001 from add/drop circulator 1002.

It should be noted that in FIG. 10, the direction of eastward beams 1001 and westward beams 1003 is different than the direction of the eastward and westward beams depicted in other FIGURES. As noted above, the terms "eastward" and "westward" are used merely to denote that the beams are traveling in opposite directions, not to denote any particular direction. With respect to FIG. 10, and the rest of the FIGURES "eastward" beams have been described as entering the add/drop circulators at a bi-directional port and exiting the add/drop circulators at an output port. "Westward" beams have been described as entering add/drop circulators at an input port and exiting the add/drop circulators at a bi-directional port. Accordingly, the appeared difference in direction of eastward beams 1001 and westward beams 1003 in FIG. 10 with respect to the direction of eastward beams 301 and 801 and westward beams 315 and 803 in the other FIGURES is merely due to the location of the input ports, output ports and bi-directional ports being depicted differently in FIG. 10 than in the other FIGURES.

In the present example, each input port may be coupled to one of a plurality of add fibers 1004 configured to carry traffic to be added to an optical network via the node associated with system 1000. Add fibers 1004 may be coupled to add ports of the node, such as add ports 202 of system 200 depicted in FIG. 2. Each output port may also be coupled to one of a plurality drop fibers 1006 configured to carry traffic to be dropped from the optical network via the node associated with system 1000. Drop fibers 1006 may be coupled to drop ports of the node, such as drop ports 204 of system 200 depicted in FIG. 2.

Add/drop circulator 1002 may also comprise a plurality of bi-directional port coupled to beam manipulation system 1008b that allows add/drop circulator 1002 to be optically coupled to an optical cross connect, such as optical cross connect 208 described with respect to FIG. 2. In some embodiments, the bi-directional port may allow for coupling of cross connect 208 and add/drop circulator 1002 using free space optics instead of fibers. Accordingly, add/drop circulator 1002 may be integrated with an optical cross-connect 208 in a single module that may also reduce costs. Additionally, producing a single add/drop circulator that may act as a plurality of add/drop circulators may also reduce costs.

Modifications, additions or omissions may be made to system 1000 without departing from the scope of the present disclosure. For example, beam manipulation systems 1008a and 1008b may comprise systems similar to beam manipulation systems 305a and 305b in FIGS. 3-7 or beam manipulation systems 805 and 807 in FIGS. 8-9. Additionally, add/drop circulator 1002 may include components not shown such as mirrors, polarization rotators or partially reflective prisms.

Although the present disclosure and its advantages have been described in detail, it should be understood that various changes, substitutions and alterations can be made herein without departing from the spirit and scope of the disclosure as defined by the following claims:

What is claimed is:

1. An optical signal bidirectional transmission system comprising:
    a bi-directional port configured to receive an eastward beam and output a westward beam;
    an input port configured only as an input port to receive the westward beam;
    an output port configured only as an output port to output the eastward beam;
    only one birefringent crystal including a first side and a second side opposite of the first side;
    a first beam manipulation system coupled to the bi-directional port and the first side of the birefringent crystal, and configured to receive the eastward beam from the bi-directional port, adjust a polarization of the eastward beam, and direct the eastward beam from the bi-directional port to the first side of the birefringent crystal; and
    a second beam manipulation system coupled to the input port, the output port, and the second side of the birefringent crystal, and configured to receive the westward beam from the input port, adjust a polarization of the westward beam, and direct the westward beam from the input port to the second side of the birefringent crystal;
    wherein the birefringent crystal is configured to:
        receive, at the first side, the eastward beam from the first beam manipulation system;
        direct the eastward beam, according to the polarization of the eastward beam, toward the second beam manipulation system such that the eastward beam may exit the second beam manipulation system through the output port;
        receive, at the second side, the westward beam from the second beam manipulation system; and
        direct the westward beam, according to the polarization of the westward beam, toward the first beam manipulation system such that the westward beam may exit the first beam manipulation system through the bi-directional port.

2. The system of claim 1, wherein:
    the first beam manipulation system is further configured to:
        split the eastward beam into a first eastward beam having a first eastward polarization and a second eastward beam having a second eastward polarization such that the first eastward polarization is substantially perpendicular to the second eastward polarization; and
        adjust the first eastward polarization and the second eastward polarization such that the first eastward polarization and the second eastward polarization are substantially equal to each other;
    the second beam manipulation system is further configured to:
        split the westward beam into a first westward beam having a first westward polarization and a second westward beam having a second westward polarization such that the first westward polarization is substantially perpendicular to the second westward polarization; and
        adjust the first and second westward polarizations such that the first and second westward polarizations are substantially equal to each other; and
    wherein the first and second beam manipulation systems are configured such that the first and second eastward polarizations are substantially perpendicular to the first and second westward polarizations upon the first and second eastward beams and the first and second westward beams entering the birefringent crystal.

3. The system of claim 2, wherein the first beam manipulation system comprises:
a first polarization beam splitter (PBS) optically coupled to the bi-directional port and configured to:
receive the eastward beam from the bi-directional port and split the eastward beam into the first and second eastward beams; and
combine the first and second westward beams back into the westward beam to exit the first PBS through the bi-directional port;
a first mirror coupled to the first PBS and configured to:
receive at least one of the first and second eastward beams from the first PBS; and
reflect at least one of the first and second eastward beams such that the first and second eastward polarizations are substantially equal to each other; and
a first polarization rotator coupled to the first PBS, the first mirror and the first side of the birefringent crystal, and configured to:
receive the first and second eastward beams from at least one of the first PBS and the first mirror;
rotate the first and second eastward polarizations approximately forty-five degrees in a first direction;
direct the first and second eastward beams toward the first side of birefringent crystal;
receive the first and second westward beams from the birefringent crystal;
rotate the first and second westward polarizations approximately forty-five degrees in a second direction, the second direction opposite the first direction; and
direct the first and second westward beams toward at least one of the first PBS and the first mirror.

4. The system of claim 3, wherein the first PBS comprises a Wollaston prism.

5. The system of claim 3, wherein the first mirror comprises a plurality of mirrors.

6. The system of claim 3, wherein the first polarization rotator comprises a faraday rotator.

7. The system of claim 3, wherein the second beam manipulation system comprises:
a second PBS optically coupled to the input port and the output port and configured to:
receive the westward beam from the input port and split the westward beam into the first and second westward beams; and
combine the first and second eastward beams back into the eastward beam to exit the second PBS through the output port;
a second mirror coupled to the second PBS and configured to:
receive at least one of the first and second westward beams from the second PBS; and
reflect at least one of the first and second westward beams such that the first and second westward polarizations are substantially equal to each other and are substantially perpendicular to the first and second eastward polarizations upon at least one of the first and second eastward beams being reflected by the first mirror; and
a second polarization rotator coupled to the second side of the birefringent crystal and configured to:
receive the first and second westward beams from at least one of the second PBS and the second mirror;
rotate the first and second westward polarizations approximately forty-five degrees in the second direction;
direct the first and second westward beams toward the second side of the birefringent crystal;
receive the first and second eastward beams from the birefringent crystal;
rotate the first and second eastward beams approximately forty-five degrees in the first direction; and
direct the first and second eastward beams toward at least one of the second PBS and the second mirror.

8. The system of claim 7, wherein the second PBS comprises a Wollaston prism.

9. The system of claim 7, wherein the second mirror comprises a plurality of mirrors.

10. The system of claim 7, wherein the first polarization rotator comprises a faraday rotator.

11. The system of claim 2, wherein the first beam manipulation system comprises:
a first polarization beam splitter (PBS) optically coupled to the bi-directional port and configured to:
receive the eastward beam from the bi-directional port and split the eastward beam into the first and second eastward beams; and
combine the first and second westward beams back into the westward beam to exit the first PBS through the bi-directional port;
a first plurality of partially reflective prisms optically coupled to the first PBS and configured to:
receive the first and second eastward beams from the first PBS and reflect the first and second eastward beams such that the first and second eastward polarizations are substantially parallel to each other upon being reflected by the first plurality of partially reflective prisms; and
refract the first and second westward beams toward the first PBS;
a first plurality of mirrors optically coupled to the first plurality of partially reflective prisms and configured to:
receive the first and second eastward beams from the first plurality of partially reflective prisms and reflect the first and second eastward beams such that the first and second eastward polarizations are maintained; and
reflect the first and second westward beams toward the first plurality of partially reflective prisms such that the first and second westward polarizations are substantially perpendicular to each other upon being reflected by the first plurality of mirrors; and
a second plurality of partially reflective prisms optically coupled to the first plurality of mirrors and the birefringent crystal and configured to:
receive the first and second eastward beams from the first plurality of mirrors and reflect the first and second eastward beams toward the birefringent crystal;
receive the first and second westward beams from the birefringent crystal and refract the first and second westward beams toward the first plurality of mirrors.

12. The system of claim 11, wherein the first PBS comprises a Wollaston prism.

13. The system of claim 11, wherein the second beam manipulation system comprises:
a second plurality of mirrors coupled to the birefringent crystal and configured to:

receive the first and second eastward beams from the birefringent crystal and reflect the first and second eastward beams such that the first and second eastward polarizations are substantially perpendicular to each other upon being reflected by the second plurality of mirrors;

a second PBS coupled to the second plurality of mirrors and output port and configured to receive the first and second eastward beams from the second plurality of mirrors and combine the first and second eastward beams back into the eastward beam to exit the second PBS through the output port;

a third PBS coupled to the input port and configured to receive the westward signal from the input port and split the westward signal into the first and second westward beams; and a third plurality of mirrors coupled to the third PBS and the second side of the birefringent crystal and configured to:

receive the first and second westward beams from the third PBS;

reflect the first and second western polarization beams toward the birefringent crystal such that, upon the first and second western beams being reflected by the third plurality of mirrors, the first and second westward polarizations are substantially equal to each other and are substantially perpendicular to the first and second eastward polarizations upon the first and second eastward beams being reflected by the first plurality of partially reflective prisms.

14. The system of claim 13, wherein at least one of the second PBS and the third PBS comprises a Wollaston prism.

15. The system of claim 1, further comprising an optical cross-connect integrated with the first PBS at the bi-directional port.

* * * * *